F. C. COOK.
Clover Huller.
No. 32,470.
Patented June 4, 1861.
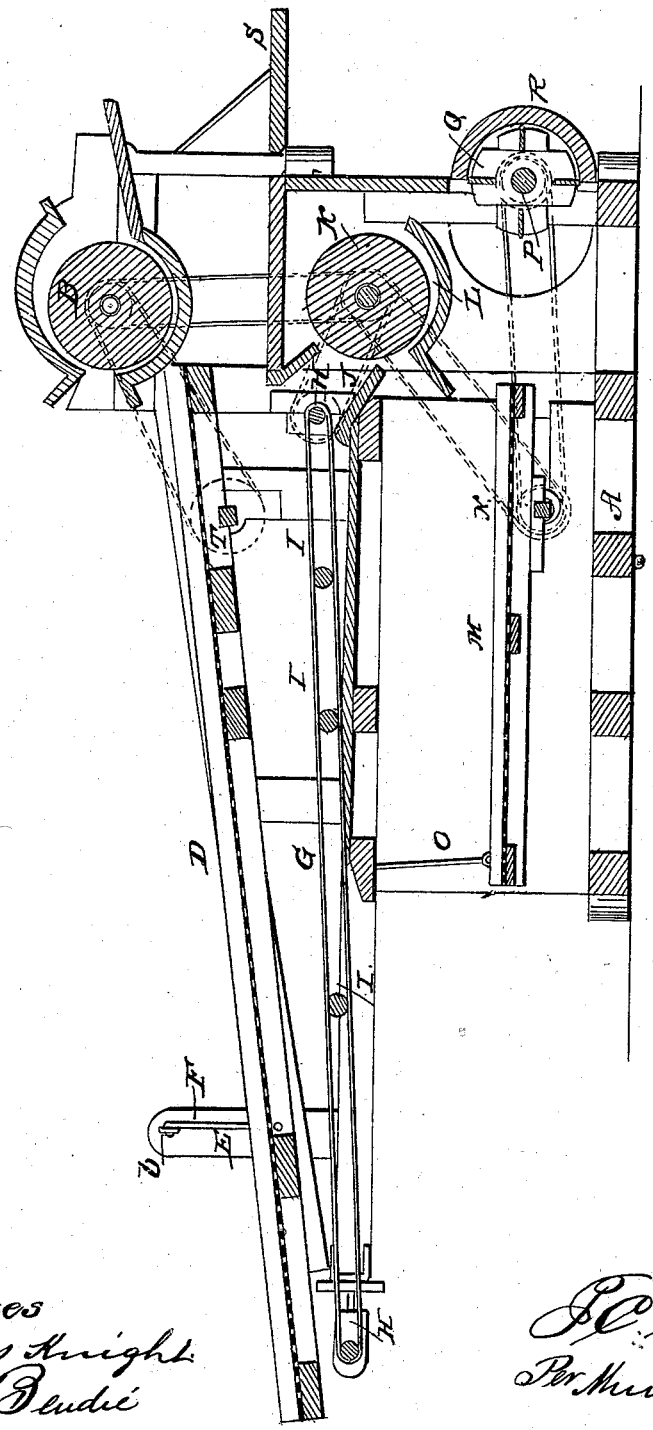
Witnesses
Octavius Knight
L. W. Bendie
Inventor
F. C. Cook
Per Munn & Co.
Attys

UNITED STATES PATENT OFFICE.

FRANCIS E. COOK, OF GUILFORD, OHIO.

MACHINE FOR HULLING AND CLEANING CLOVER-SEED.

Specification of Letters Patent No. 32,470, dated June 4, 1861.

*To all whom it may concern:*

Be it known that I, FRANCIS E. COOK, of Guilford, in the county of Medina and State of Ohio, have invented a new and Improved Machine for Threshing, Hulling, and Cleaning Clover-Seed; and I do hereby declare that the following is a full, clear, and exact description of the same, reference being had to the accompanying drawings, representing my invention by a vertical longitudinal section.

The subject of this invention is a machine for threshing, hulling and cleaning clover seed, and the invention consists in a peculiar combination of parts performing the successive operations in a single machine as hereinafter more fully explained.

To enable others skilled in the art to make and use my invention I will proceed to describe its construction and operation.

A, represents the framing of the machine.

B, is the threshing cylinder, provided with a series of beaters or teeth on its periphery and journaled at each end in boxes attached to the framing.

C, is a concave also provided with teeth and located in the machine immediately under the threshing cylinder.

D, is a long shoe suspended at the rear end from hooks *b*, on the inner sides of standards E by links F, catching over the said hooks. The front part of the shoe rests upon a crank shaft T, which is journaled in boxes in the sides of the frame and which imparts a shaking motion to the shoe by means of a belt passing from a pulley on the threshing cylinder shaft over a pulley on the crank shaft.

G, is an endless apron passing over rollers H, H', at each end and supported between the said rollers and prevented from sagging by friction rollers I, I.

J, is a spout through which the clover seed and chaff pass.

K, is a hulling cylinder and working in connection with the concave L, to remove the hulls from the clover seed.

M, is a shoe resting at its front end upon a crank shaft N, and suspended from the frame at the rear end by links O, in precisely the same manner as the long shoe.

P, is a fan shaft and Q, wings forming the fan.

R, is the fan casing.

The bottoms of the two shoes are composed of netting or perforated plate.

S, is a table for holding the clover previous to threshing.

The main driving pulley is on one end of the threshing cylinder shaft which by means of a pulley on its opposite end imparts motion through a bolt to the crank shaft of the long shoe and also by another belt to the hulling cylinder which communicates motion by means of belts to the endless apron and to the lower shoe and from thence by a belt to the fan.

Operation: The machine being put in motion the clover is fed in between the teeth of the threshing cylinder and concave which beats the straw and thereby effectually separates the clover seed therefrom causing both to be thrown on to the long shoe, the shaking motion of which separates the seed and chaff from the straw. The seed and chaff pass through the meshes of the screen of the long shoe and fall upon the endless apron immediately beneath it whence they are carried forward and precipitated through the spout on to the hulling cylinder from thence it is carried over and between the said cylinder and concave and by the action thereof the hulls are removed from the seed. The seed and chaff then fall upon the lower shoe where they are again agitated and the chaff and extraneous matters thrown out by the blast of air formed by the action of the fan. The straw passes out at the rear end of the long shoe.

The belting may be arranged in any proper manner to suit the speed and other requirements of the various parts. In the drawing the belts on the near side of the machine are represented in red those on the farther side in black.

What I claim as new and desire to secure by Letters Patent, is,

The combination of the threshing cylinder B, hulling cylinder K, shaking screens D, and M, conveying apron G, and fan P, Q, arranged and operating in the manner and for the purposes herein shown and described.

FRANCIS E. COOK.

Witnesses:
A. G. HECKMAN,
IRA L. WELCH.